2,837,170
AIR FILTER LUBRICANTS

Jack W. Armstrong, Concord, and Harold A. Woods and Charles E. Francis, Martinez, Calif., assignors to Shell Development Company, New York, N. Y., a corporation of Delaware No Drawing. Application June 18, 1956
Serial No. 591,782

6 Claims. (Cl. 183—51)

The present invention relates to filters and filtering compositions for use in filtering air and other gases. More particularly, the present invention relates to thixotropic gel-like compositions to which dust and other foreign matter coming in contact therewith will adhere, which compositions are applied to filter bases which may be metal screens, fiber mat, glass wool or other fibrous materials used in air filters.

The prior art discloses various oleaginous compositions containing soaps, chlorinated compounds, phosphorus compounds and the like as dust catching and retaining compositions for use on various types of filters. Compositions of this type are objectionable because (1) they tend to drain away from the fibrous base, particularly at elevated temperatures, thus reducing the dust-catching efficiency of the composition, (2) they possess decided odors, (3) in some cases they are a fire hazard, and (4) large amounts of thickening and tackiness agents are required, making the composition costly.

It has now been discovered that excellent air filters can be made by coating the metal screens or fibrous material of air filters with thixotropic gel-like compositions comprising a major amount of mineral lubricating oil containing a synergistic additive combination in critical amounts consisting essentially of from about 0.5% to about 3% and preferably between 1.3% and 1.5% of a water-resistant aminated oleophilic clay which has been treated with a phosphorus-containing acid, from about 0.5% to 2% of an alkylene glycol or a derivative thereof and from about 0.5% to about 5% and preferably from about 1% to about 3% of an oil-soluble adhesive polymeric compound, such as hydrocarbon polymers known by the trade names of "Paratone" and "Santodex." The molecular weight of the polymers can vary from 10,000 to 500,000.

The water-resistant oleophilic clay can be prepared by aminating suitable colloidal clays, such as bentonites, Hectorite, as well as synthetic clays with water-repelling amines so as to provide the resulting amino gel with an oleophilic character and thereafter treating said oleophilic clay with an inorganic or organic acidic phosphorus compound. If desired the clay can be first treated with a phosphorus-containing acid and thereafter treated with an amine. The final product may be an onium compound or a phosphate salt or the amine may be physically adsorbed on the acidified clay or it may be a mixture of these materials. The amines which can be used for aminating clays include long chain aliphatic amines having from 10 to 20 carbon atoms in the molecule e. g. dodecyl and octadecyl amines; amine salts of inorganic or organic acids and quaternary ammonium salts, such as tetradecylamine hydrochloride, octadecylamine hydrochloride, dioctyldecylamine hydrochloride, octadecylamine hydrobromide; octadecylamine acetate, dioctyldecylamine acetate, 12-hydroxystearylamine lactate; trimethyl dodecylammonium chloride, triethyl hexadecyl ammonium chloride, dimethyldiheptadecyl ammonium chloride and the like. Other amino compounds which can be used include acrolein-ammonia condensation products, or epichlorohydrin-ammonia condensation products. The acids which can be used to acidify the clay include inorganic or organic acids of phosphorus, such as phosphorus acid, phosphoric acid, hypophosphorus acid, hypophosphoric acid, orthophosphoric acid, pyrophosphoric acid, triphosphoric acid, tetraphosphoric acid, metaphosphoric acid, dilauryl hydrogen phosphate, dicetyl hydrogen phosphate, distearyl hydrogen phosphate, lauryl cetyl hydrogen phosphate, stearyl dihydrogen phosphate, lauryl dihydrogen phosphate, dimethyl hydrogen phosphate, dibutyl hydrogen phosphate, tetradecane-1-phosphinic acid, 10-phenyldecane-1-phosphonic acid.

The following examples illustrate a method of preparing the water-resistant clay.

EXAMPLE I

Hectorite clay was dispersed in water to form a 2% hydrosol. A settling period of twelve hours, followed by decanting the milky sol, eliminated the gangue. The Hectorite was acidified with phosphoric acid and then treated with dimethyldiheptadecyl ammonium chloride to convert all of the acidified clay to the phosphate salt. The salt form of the amino gel settled rapidly and was readily water-washed, after which is was filtered to remove most of the water.

EXAMPLE II

The same procedure described in Example I was followed using as the aminating agent epichlorohydrin-ammonium condensation product instead of dimethyldiheptadecyl ammonium chloride.

EXAMPLE III

The same procedure described in Example I was followed using as the aminating agent tallow fatty acid ⅓ amide of 5:1 ammonia-epichlorohydrin condensation product.

EXAMPLE IV

The same procedure described in Example I was followed using as the aminating agent a $C_{14}$–$C_{18}$ saturated fatty acid ⅓ amino-amide of 5:1 ammonia-epichlorohydrin condensation product.

The alkylene glycols suitable for use in compositions of this invention are added in order to prevent gelation due to the possible presence of water and include ethylene glycol, propylene glycol, hexylene glycol and mixtures thereof. Other materials which can be used in place of or in conjunction with alkylene glycols are the ethers of alkylene glycol or dialkylene glycol such as ethers of ethylene glycol and ethers of diethylene gylcol. Compounds of this type include ethylene glycol monoethyl ether, ethylene glycol monobutyl ether, ethylene glycol monoethyl butyl ether, ethylene glycol monophenyl ether, diethylene glycol monomethyl ether, diethylene glycol monoethyl ether, diethylene glycol monobutyl ether, diethylene glycol monophenyl ether and the like.

The polymers are exemplified by polymers of olefins having from 2 to 12 carbon atoms including aliphatic and aryl aliphatic olefins including homo and copolymers such as polyethylene, polybutene and copolymers of styrene with alkenes and natural rubber and the like.

The base oil can be a hydrocarbon oil derived from paraffinic, naphthenic, asphaltic or mixed base crude petroleum stocks, suitably refined and can range in viscosity or boiling point from the gas oil to the heavy lube oil viscosity or boiling range. The oils may be low or high viscosity index oils.

Examples illustrating compositions of the invention are as follows:

*Composition A*

| | | |
|---|---|---|
| Hectorite clay of Example IV | percent | 1.30 |
| Hexylene glycol | do | 1.0 |
| Polybutene (20,000 M) | do | 2.0 |
| Mineral oil (400 SSU at 100° F.) | | Balance |

*Composition B*

| | | |
|---|---|---|
| Hectorite clay of Example III | percent | 1.30 |
| Hexylene glycol | do | 1.0 |
| Polybutene (20,000 M) | do | 2.0 |
| Mineral oil (400 SSU at 100° F.) | | Balance |

*Composition C*

| | | |
|---|---|---|
| Hectorite clay of Example IV | percent | 1.40 |
| Hexylene glycol | do | 1.0 |
| Polybutene (20,000 M) | do | 2.0 |
| Mineral oil (400 SSU at 100° F.) | | Balance |

*Composition D*

| | | |
|---|---|---|
| Hectorite clay of Example II | percent | 1.40 |
| Hexylene glycol | do | 1.0 |
| Polybutene (20,000 M) | do | 2.0 |
| Mineral oil (400 SSU at 100° F.) | | Balance |

The effectiveness of compositions of this invention as air-filter coatings is demonstrated from the data presented below. In test I Farr-Air Filters (4"×4"×2") were coated with test compositions and subjected to high concentration (20 grams) dust feed in a wind tunnel. AC Spark Plug Standardized Fine Air Cleaner Test Dust was fed in approximately 10 minutes with an adjusted air flow of 520 F. P. M. through the filter. Compositions A, B, C and D showed a filter efficiency of over 60%. When the Hectorite clay in Compositions A, B, C or D was replaced with a soap, such as an alkali soap (Composition Y) the filter efficiency was around 35-40%.

In the adhesion test (II) tarred welding rods 1/16" diameter were dipped into test compositions, removed and the rods were then hung vertically in an oven at 180° F. for 24 hours and then the rods were reweighed. The weight of residue retained on rods coated with Compositions A, B, C and D was around 0.035 gram whereas only 0.008 gram was retained on rods coated with an oil (400 SSU/100° F.) containing 3.4% polyethylene (Composition Z).

In field tests on air filters used in diesel locomotives Compositions A, B, C and D gave excellent results over a period of several months. These compositions were easy to apply to the filters even at ambient temperatures. They showed no tendency to drip off the filters during use even at elevated temperatures; they gave off no disagreeable odors and they had a dust retention efficiency of over 60%. Commercial air-filter oils containing olefin polymers and/or soaps when used in diesel locomotive air filters were poor in dust retention efficiency, they were difficult to apply even at elevated temperatures and dripped during use. From the above it can be seen that compositions of the present invention possess viscosity temperature properties such that they can be easily applied to filter screens at low temperatures and when once on the screens maintain a high degree of adhesiveness at elevated temperatures and resist dripping, particularly at elevated temperatures.

We claim as our invention:

1. A thixotropic lubricating oil composition for coating air filters consisting essentially of a mineral lubricating oil containing from about 1% to about 2% of a water-resistant aminated oleophilic clay treated with phosphoric acid, from about 0.5% to about 2% of an alkylene glycol the alkylene radical containing from 2 to 6 carbon atoms and from about 0.5% to about 5% of an oil-soluble adhesive olefin hydrocarbon polymer having a molecular weight in the range of from about 10,000 to about 500,000, said polymer being derived from an olefin monomer having from 2 to 4 carbon atoms.

2. The composition of claim 1 wherein the clay is Hectorite.

3. A thixotropic lubricating oil composition for coating air-filters consisting essentially of mineral lubricating oil containing from about 1.3% to 1.5% of a fatty acid amino-amide of ammonia-epichlorohydrin-phosphoric acid treated Hectorite, from about 0.5% to about 2% of hexylene glycol and from about 1% to about 3% of polybutene having a molecular weight of around 20,000.

4. An air filter comprising a metal screen coated with the composition of claim 1.

5. An air filter comprising a metal screen coated with the composition of claim 2.

6. An air filter comprising a metal screen coated with the composition of claim 3.

References Cited in the file of this patent

UNITED STATES PATENTS

| | | |
|---|---|---|
| 2,626,899 | Abrams et al. | Jan. 27, 1953 |
| 2,627,938 | Frohmader et al. | Feb. 10, 1953 |
| 2,668,145 | Ronay | Feb. 2, 1954 |
| 2,704,276 | McCarthy et al. | Mar. 15, 1955 |

OTHER REFERENCES

Boner: "Manufacture and Application of Lubricating Greases," Reinhold Publishing Corp., New York, 1954, p. 362.